No. 694,853.  
G. H. GUEST.  
CASH REGISTER.  
(Application filed Nov. 20, 1894.)  
(No Model.)

Patented Mar. 4, 1902.

4 Sheets—Sheet 1.

Attest:  
Henry T. Hirsch  
Wm. H. Capel

Inventor:  
George H. Guest.  
by H. E. Townsend  
Attorney.

No. 694,853. Patented Mar. 4, 1902.
G. H. GUEST.
CASH REGISTER.
(Application filed Nov. 20, 1894.)
(No Model.) 4 Sheets—Sheet 2.

Attest:
Henry T. Hirsch
W. H. Capel

Inventor:
George H. Guest
by H. C. Townsend
Attorney.

No. 694,853. Patented Mar. 4, 1902.
G. H. GUEST.
CASH REGISTER.
(Application filed Nov. 20, 1894.)
(No Model.) 4 Sheets—Sheet 3.
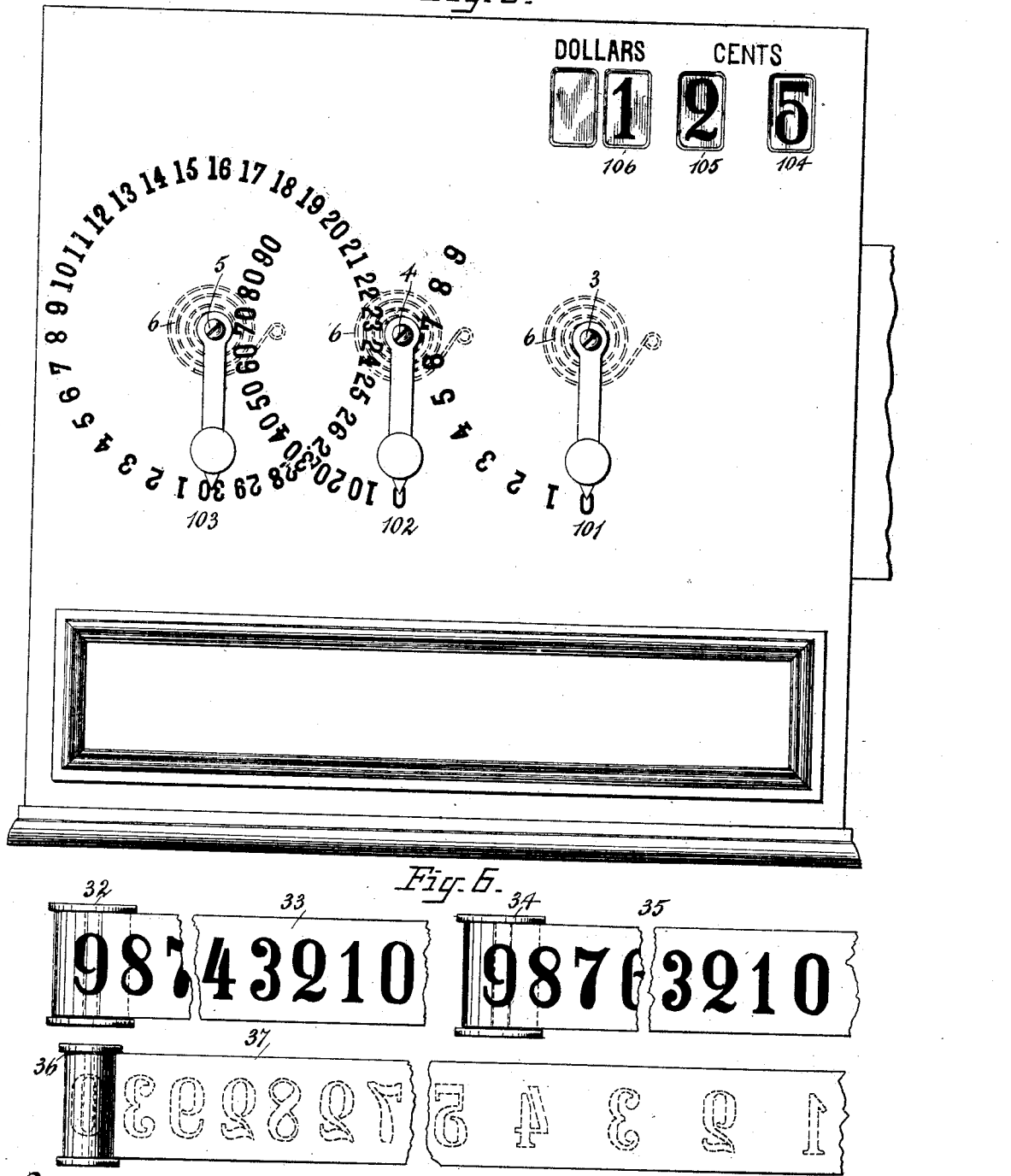

No. 694,853. Patented Mar. 4, 1902.
G. H. GUEST.
CASH REGISTER.
(Application filed Nov. 20, 1894.)
(No Model.) 4 Sheets—Sheet 4.
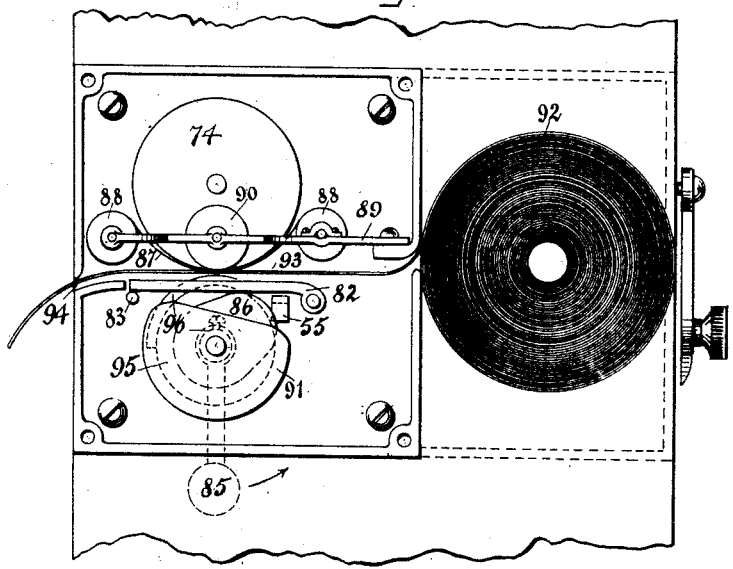
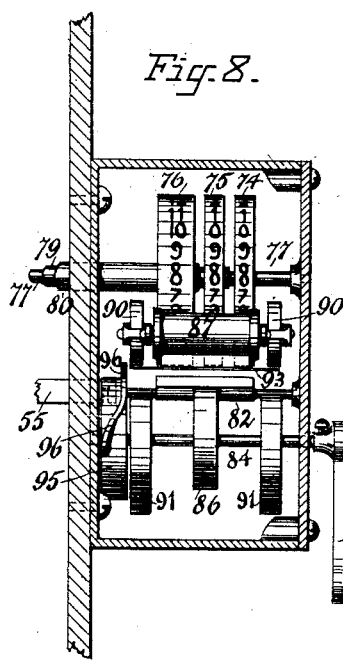
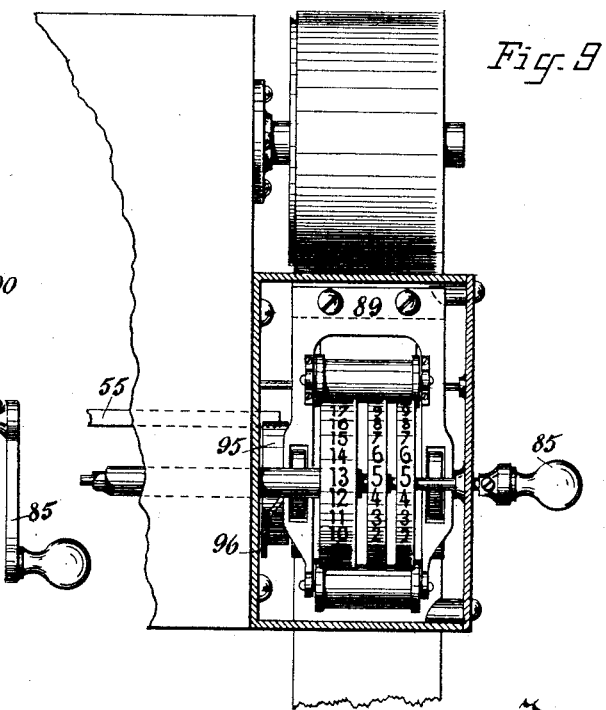

UNITED STATES PATENT OFFICE.

GEORGE H. GUEST, OF NEW YORK, N. Y., ASSIGNOR, BY MESNE ASSIGNMENTS, TO NATIONAL CASH REGISTER COMPANY, OF JERSEY CITY, NEW JERSEY, A CORPORATION OF NEW JERSEY.

CASH-REGISTER.

SPECIFICATION forming part of Letters Patent No. 694,853, dated March 4, 1902.

Application filed November 20, 1894. Serial No. 529,356. (No model.)

*To all whom it may concern:*

Be it known that I, GEORGE H. GUEST, a citizen of the United States, and a resident of New York, in the county of New York and State of New York, have invented a certain new and useful Cash-Register, of which the following is a specification.

This invention relates to improvements in cash-registers, and has more particular relation to improvements in registers of the check-printing type.

The invention consists of certain novel constructions, combinations, and arrangements of parts, all of which will be hereinafter more particularly set forth and claimed.

Figure 1:
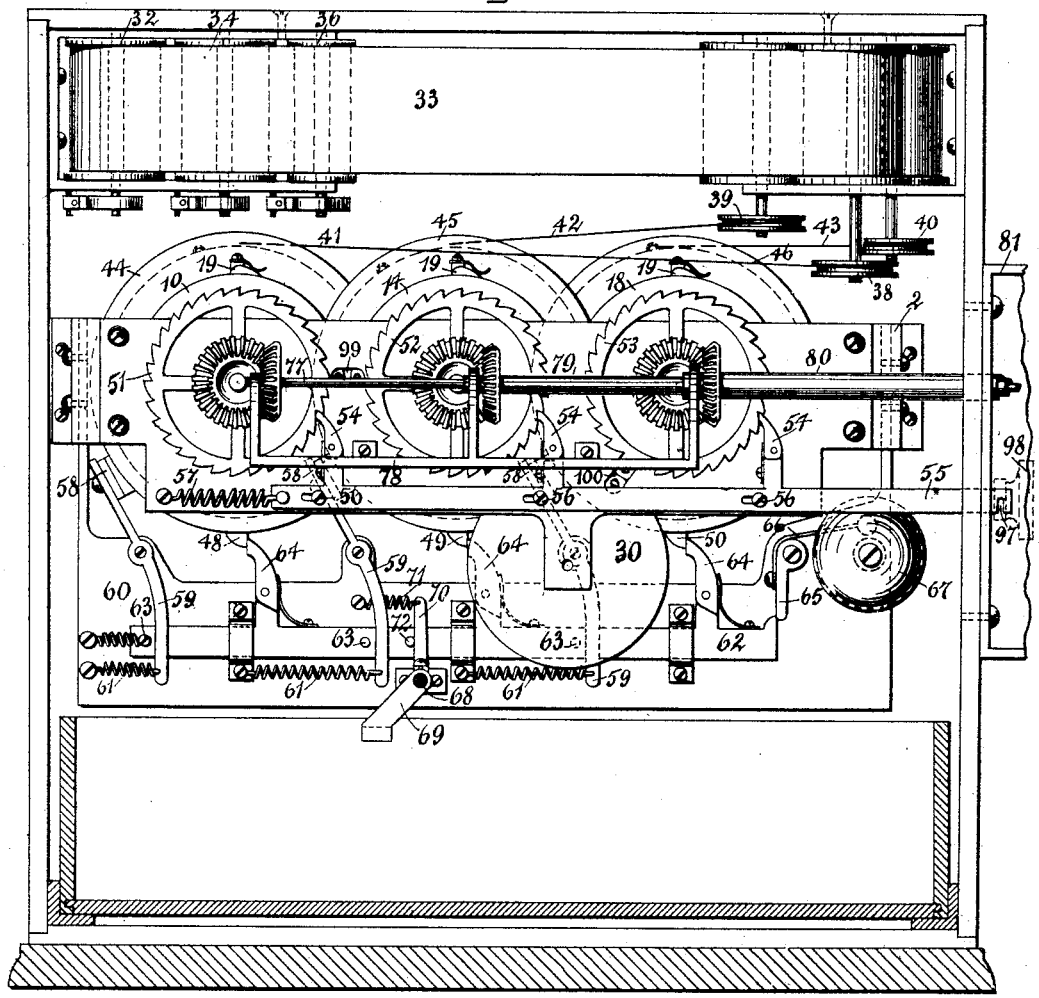
Figure 2:
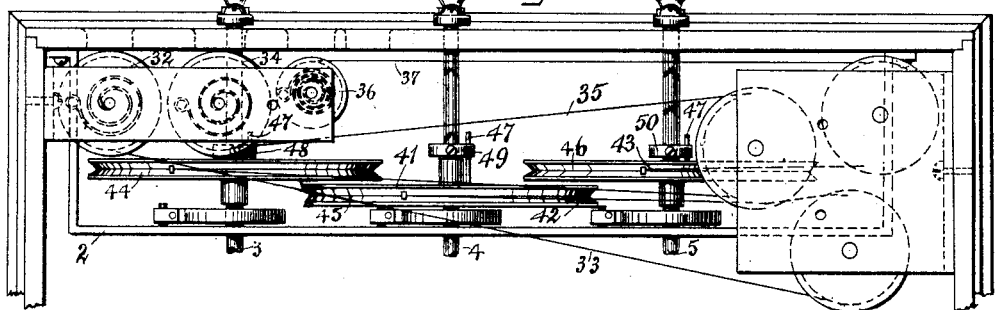
Figure 3:
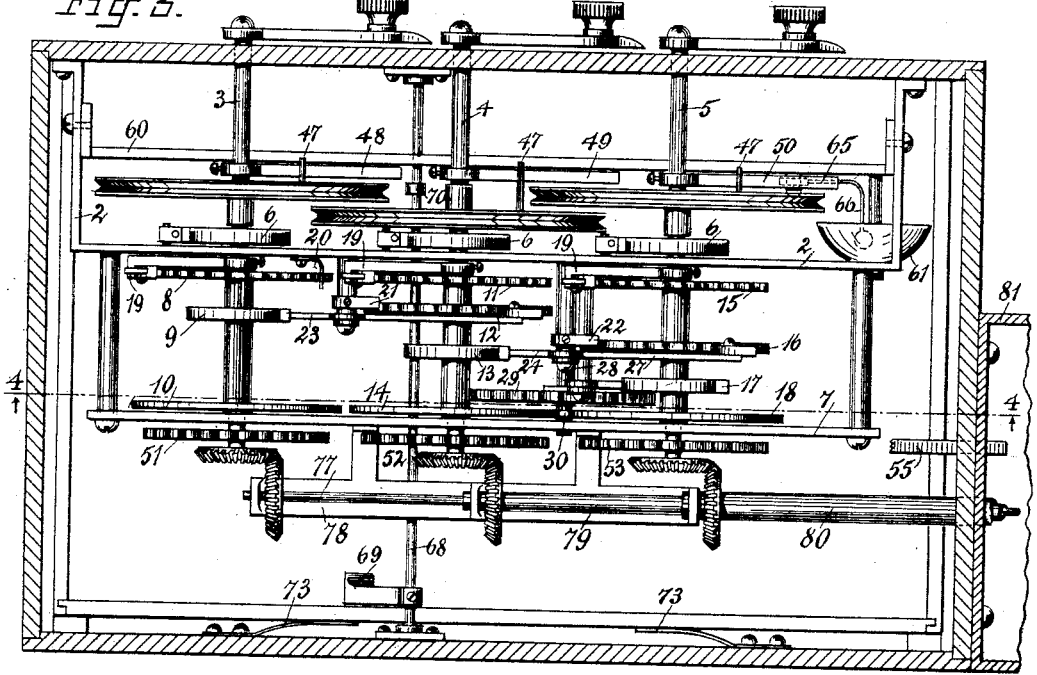
Figure 4:
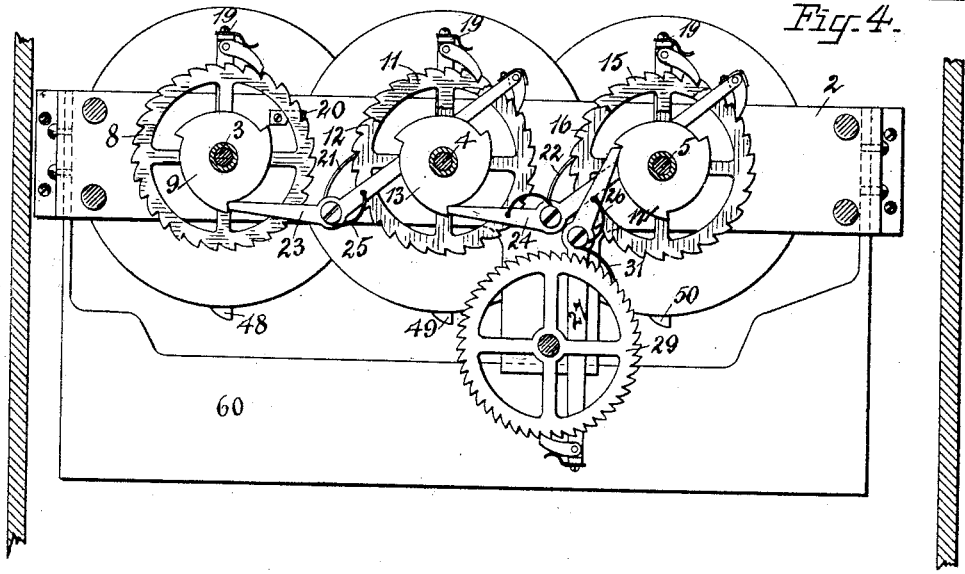

In the accompanying drawings, which form a part of this specification, Figure 1 represents in side elevation the mechanism comprising my improved cash-register, the printing apparatus being omitted. Fig. 2 is a plan view of the indicator mechanism. Fig. 3 is a plan of the registering or adding mechanism and the actuator mechanism for the indicator and for the type-wheels. Fig. 4 is a vertical section through the register, taken in the plane indicated by the line 4 4 in Fig. 3. Fig. 5 is a front elevation of the cash-register. Fig. 6 represents the several tapes of the indicator as displayed. Fig. 7 is a side view of the printing mechanism. Fig. 8 is an end view thereof. Fig. 9 is a plan view of the printing mechanism in the position shown in Fig. 8.

1 represents the case for inclosing the various parts of my cash-register, which case may be of any form and of any material suitable for the purpose.

2 represents the main plate for supporting the registering or adding mechanism and its appurtenances. Said mechanism consists of the actuating-shafts 3 4 5, each of which is provided with a suitable crank at the outside of the case, which terminates in a pointer for following the gradations upon the scales appearing on the front of the case. These shafts are automatically returnable to zero by means of the helical springs 6, attached thereto and to plate 2. Another plate 7 is provided for supporting the inner ends of said actuating-shafts. This plate may be supported in any suitable manner, but is shown supported upon plate 2 by intermediate posts.

Upon shaft 3, between plates 2 and 7, is a sleeve bearing the actuating ratchet-wheel 8, the adding-cam 9, and the numbered disk 10. Upon shaft 4 is a similar sleeve carrying an actuating ratchet-wheel 11, an adding ratchet-wheel 12, an adding-cam 13, and a number-disk 14. Upon shaft 5 is also a sleeve bearing actuating ratchet-wheel 15, an adding ratchet-wheel 16, an adding-cam 17, and a number-disk 18. To the shafts 3, 4, and 5 are rigidly secured the driving-pawl carriers 19. Suitable detents 20, 21, and 22 are provided, respectively, for the actuating ratchet-wheel 8 and the adding ratchet-wheels 12 and 16. These may be mounted in any suitable way; but for the sake of illustration detent 20 is shown in Fig. 3 as mounted upon plate 2, while the other two detents are shown as mounted, respectively, on posts carrying the adding-levers 23 and 24, respectively. The adding-lever 23 is actuated by cam 9 for driving ratchet-wheel 12 and is returned by means of any suitable spring—such, for instance, as spring 25. (Shown in Fig. 4.) The adding-lever 24 is actuated by cam 13 for driving ratchet-wheel 16 and is returned by a spring 26. Adding-cam 17 operates upon ratchet-lever 27, pivoted to post 28, which lever operates ratchet-wheel 29, mounted upon a shaft extending from a projection on plate 2 to a like projection on plate 7. The ratchet-wheel 29 is connected to the shaft which also carries a number-disk 30. The detent for ratchet-wheel 29 is shown at 31 as mounted upon post 28.

The indicator mechanism consists of tapes of any suitable material, upon which may be printed the required numbers which shall be displayed through suitable apertures in the case. Each tape is wound upon a spring-drum at one corner of the case, as shown in Figs. 1 and 2, and has its free end attached to a roller mounted in the opposite corner of said case. The drum 32 carries the tape 33, bearing numbers "0" to "9" for representing cents, and drum 34 carries tape 35, also bearing numbers "0" to "9" for representing dimes, while drum 36 carries tape 37, bearing numbers from "1" to "30" for representing dollars. The rollers to which the free ends of said tapes are connected carry upon the lower ends of their shafts sheaves 38, 39, and 40, respectively. Upon these sheaves flexible connections, such as cords or chains 41 42 43, are wound and have their free ends connected to pulleys 44, 45, and 46, sleeved or otherwise loosely mounted upon shafts 3, 4, and 5. From these pulleys project pins or stops 47 for engagement by arms 48, 49, and 50, which are rigidly secured, respectively, to said shafts 3, 4, and 5.

Upon shafts 3, 4, and 5 at the outside of plate 7 are mounted detent-wheels 51, 52, and 53, respectively, with which engage spring-pawls 54, carried upon a bar 55, mounted to move longitudinally upon pins 56, passed through slots therein and secured in plate 7. To this bar 55 is connected a spring 57 for holding the detents 54 in engagement with their respective detent-wheels. This bar 55 also projects through an aperture in the wall of the case, so as to be operative from the outside thereof. By means of the detent-wheels shafts 3, 4, and 5 are retained in the position to which they are turned until the bar 55 is moved to the right and the detents connected thereto are released from their respective wheels. Then the actuating-shafts are returned to zero by means of the springs 6.

When the actuating-shafts are moved to register a purchase, the arms 48, 49, or 50 engage pins 47, and pulleys 44, 45, or 46 are rotated with said shafts. This winds the flexible connections 41, 42, or 43 upon their respective pulleys, thereby rotating the rollers to which sheaves 38, 39, or 40 are connected and while winding the tapes thereupon cause them to unwind from the drums 32, 34, or 36, which act winds up their respective springs. The parts are now held in the positions to which they have been moved by means of the detents 54. It is also desirable to retain the indicator in this position after the actuating-shafts have returned to zero. To accomplish this, I provide suitable detent mechanism therefor—such, for example, as brakes 58, bearing upon pulleys 44, 45, and 46 and carried by levers 59, pivoted upon any suitable support, such as a plate 60, shown for convenience of illustration as suspended from plate 2. These brakes are held upon the pulleys under tension of suitable springs, as indicated at 61. To release the brakes, I provide a bar, as 62, mounted in suitable guides upon plate 60 and provided with pins 63 for engagement with the rear sides of the levers 59. Upon this bar 62 are mounted detents 64, with which engage, respectively, the arms 48, 49, and 50. From this construction it will be seen that when any one of the arms is moved in the initial movement of the register the bar 62 will be moved, and all the brakes will be released from their respective pulleys, allowing the latter to be actuated by the unwinding of the cords 41, 42, or 43 under the influence of the springs upon the roller or rollers carrying the tape or tapes displayed. It will be observed from the above that after one of the pulleys has been set that it is held in position by both its respective brake and its pawl 54. A subsequent operation of one of the remaining pulleys will of course temporarily release the brake of the first-mentioned pulley, while the latter will be held to the position to which it was turned by its said pawl 54. I also propose to operate a bell by the actuation of the bar 62. To this end I mount upon plate 60 an arm 65, which shall engage a projection upon said bar and also carry a spring-hammer 66 for striking the gong 67, also mounted upon said plate 60. Said hammer in its normal position rests, as shown in Fig. 1, upon the stud for mounting the gong and is thrown against the gong by movement of the bar 62 to the right. This movement of the bar causes its projection to pass under the lower end of the arm 65, so that the spring-hammer 66 will fall back again upon the mounting-stud of the gong. Now when the bar 62 moves to the left again the spring-hammer will give to allow the projection of said bar to force the arm 65 upward and pass under the same to its original position. I also propose to operate a drawer-locking device by the movement of the bar 62. Said locking device consists of a rock-shaft 68, mounted in suitable bearings at the front and rear walls of the case and provided with a locking-arm 69, which engages the inner side of the rear wall of the money-drawer when in place. Upon the rock-shaft 68 is also mounted an upwardly-projecting arm 70, which is held by a spring 71 in engagement with a pin 72, carried by bar 62. As bar 62 is moved to the right it forces arm 70 over and raises locking-arm 69 free from the money-drawer. Upon the return of bar 62 the locking-arm 69 is also returned to its normal position. Then as the money-drawer is returned to place its rear side engages with the inclined forward projection of arm 69 and raises it up in the act of passing by it, the spring 71 returning it to place again and locking the drawer.

Any suitable springs may be used for forcing the money-drawer out as the locking-arm is raised; but for the sake of illustration I have shown them as plate-springs 73.

The mechanism as thus far described may be used for various purposes where it is not necessary or desirable to issue checks for the amounts of purchase; but for such use as makes it necessary to issue checks I provide a printing mechanism which may be operated in connection therewith and may be readily attached or detached from the registering and indicating mechanism. Such printing mechanism consists of the usual type-wheels, as indicated at 74, 75, and 76 in Figs. 7, 8, and 9. Wheel 74 is mounted upon a shaft 77, supported in suitable bearings mounted upon a bar 78, attached to plate 7. Wheel 75 is mounted upon a hollow shaft 79, sleeved upon shaft 77 and journaled in bearings rising from said bar 78, and wheel 76 is mounted upon a hollow shaft 80, sleeved upon said shaft 79 and mounted in a bearing also connected to said bar 78. Said sleeve 80 may also have a bearing in the wall of the printing-case 81, which is shown as screwed to the side of the register-case. Said shafts carry upon their inner ends bevel-gear, as shown, which mesh with corresponding bevel-gear mounted upon the actuating-shafts 3, 4, and 5, respectively, so that the type-wheels shall move in unison with the respective actuating-shafts of the register.

The printing mechanism coöperating with the type-wheels, as stated, is mounted in a casing 81 and consists of a platen 82, pivoted at one end upon a shaft extending from one wall to the other of the printing-case and resting at its free end upon a stop 83, similarly located. A shaft 84 extends through the printing-case and is provided on the outside with a crank 85, and to this shaft is secured a cam 86 for forcing the platen against the type.

The type may be inked in any suitable manner; but for the sake of illustration I have shown it as inked by means of a type-ribbon 87, carried by rollers 88, which are mounted in bearings upon a plate-spring 89, secured to a projection upon the wall of the case. This plate-spring carries in suitable bearings feeding-wheels 90, mounted at either side of the type-wheels. For coöperation with these feeding-wheels cams, as 91, are mounted upon the shaft 84.

The paper may be mounted in a roll 92 in any suitable position upon the case of the register and may, if desired, be included within the printing-case, as indicated in dotted lines in Fig. 7. The paper passes over the platen between it and the ribbon, as indicated at 93, and when printed issues through a slot 94 in the side of the printing-case.

The operation of the printer is as follows: The type-wheel having been set by the operation of the register, crank 85 is turned in the direction of the arrow in Fig. 7, causing cam 86 to force the platen upward, carrying the paper and ribbon against the type. Then as the crank is continued in its rotation said cam recedes from the platen, and as it recedes cams 91 catch the edges of the paper between them and the feeding-rollers 90 and feed the paper forward the required distance, the operating-surface, consisting of the cams 91, being properly proportioned to feed only so much paper as is necessary. The paper may be perforated upon the roll, so that the checks may be easily torn therefrom, or it may be imperforate and the checks may be torn off against the edge of the slot 94.

For the operation of the releasing mechanism for the actuating-shafts of the register I mount a cam, as 95, upon the shaft 84, whose flange 96 shall be formed as shown in Figs. 8 and 9 and shall extend over a portion of the diameter of said cam. This flange will engage in a slot 97 on the projecting end of bar 55, so as to draw said bar outwardly and release the detents 54 from their wheels just as the printing of the check has been accomplished and while the feeding of the paper is taking place, thus allowing the actuating-shafts of the register to return to zero simultaneously and be in position for the next registering operation.

In case the register is used without the printing mechanism a knob, as 98, (shown in dotted lines in Fig. 1,) may be connected to said bar 55 for releasing the actuating mechanism of the register.

The numbered disks 10, 14, 18, and 30 may display their figures through suitable apertures in the plate 7, as indicated at 99 and 100.

Each adding-cam 9, 13, and 17 is divided into three lobes, each lobe representing ten digits, and the ratchet-wheels 8, 11, 12, 15, and 16 bear each thirty teeth to correspond with the adding-cams. From this it will be seen that in ringing up a purchase of nine cents it is only necessary to rotate the shaft 3 through one-third of a circle, while in ringing up ninety cents it is only necessary to rotate the shaft 4 through one-third of a circle; but in ringing up any number of dollars from one to thirty shaft 5 may be turned through the required arc.

The adding mechanism is the same as in many other registers. The maximum amount allotted to one actuating-shaft causes a movement of one tooth upon the adding-ratchet of the next shaft, and so on to shaft 5, where the maximum amount allotted to said shaft being turned in will actuate the adding ratchet-wheel 29 through three teeth. I have shown the adding ratchet-wheel 29 as carrying fifty teeth and adapted to register ten dollars for each tooth, so that the register as represented is capable of registering five hundred dollars plus the sums indicated by the number-disks 10, 14, and 18.

The indicator is constructed to represent purchases from one cent to thirty dollars.

The operation of the device, in brief, is as follows: Supposing a purchase of one dollar and twenty-five cents to have been made, the shaft 3 is rotated until its crank points to number "5" on the scale 101 and the shaft 4 is rotated until its crank points to "20" on the scale 102 and shaft 5 is rotated until its crank points to "1" on scale 103. This will cause tape 33 to unwind and display the figure "5" at the opening 104 and tape 35 to unwind and display the figure "2" at opening 105 and tape 37 to unwind and display figure "1" at opening 106. Crank 85 of the printing mechanism is then rotated, the check printed, and as the check is about to issue bar 55 is operated by cam 95, which allows the actuating-shafts 3, 4, and 5 to return their cranks to zero, which in returning operate the register, the indicator still remaining as set and exhibiting "1" at the dollars-opening and "25" at the centsopenings. At the initial movement of any one of the shafts 3, 4, or 5 in ringing up a subsequent purchase bar 62 will be moved to the right, causing pins 63 to engage with the brake-levers 59 and release all the brakes from their respective pulleys, which pulleys being free to rotate will allow the springs on the drums 32, 34, and 36 to wind up their respective tapes, returning the indicator to zero. The subsequent purchase will then appear as previously described.

In constructing this machine many changes in the proportions and arrangement of the various parts may be resorted to without departing from my invention, the gist of which resides in the progressively-moving indicator returnable to zero at the initial movement of each act of registration and in providing for the simultaneous and automatic return of the actuating mechanism of the register, and in the operation in connection with the indicator of a printing device and in so constructing and connecting these principal features that a perfectly-operating cash-register may be produced which shall be capable of registering and indicating any number of cents, and at the same time shall be simple in construction and easy of operation. The printing mechanism is so designed that it may be readily detached and the indicator and register used without it. I have shown the printing mechanism attached to the outside of the case; but obviously it might be located within it.

The machine as illustrated is designed for placing upon a back counter and to be operated from the front. By obvious changes, however, it may be made operable from the rear side and have upon its face simply the indicator-openings.

What I claim as my invention is—

1. In a cash-register, the combination with a registering mechanism, of a pulley loose upon the operating-shaft of the same, means connecting said pulley and shaft so as to leave said pulley free to turn independently in one direction but cause it to turn with the shaft in an opposite direction, an indicator consisting of a graduated tape rolled upon a suitable roller, a winding-roller connected to said tape, and means connecting the pulley and winding-roller.

2. In a cash-register, the combination with the registering mechanism, of a pulley sleeved upon the operating-shaft thereof, means for rotating it when the shaft moves in one direction, means for retaining it in the position to which it is moved, an indicator automatically returnable to zero, and connected to said pulley, and means for releasing the pulley and allowing the indicator to return to zero.

3. In a cash-register, the combination with the register mechanism, of a pulley sleeved upon the operating-shaft thereof, an arm secured to said shaft, a loose connection between said arm and pulley, a detent engaging said pulley, a releasing device for the detent operated by said arm, and an indicator automatically returnable to zero connected to said pulley.

4. In a cash-register, the combination with the register mechanism, of pulleys each idle upon the operating-shafts of said mechanism, means for rotating them with said shafts, detents acting upon said pulleys, means connected with each of said shafts for releasing said detents, and an indicator connected to and operated by said pulleys.

5. In a cash-register, the combination with the registering mechanism, of an indicator operable from pulleys upon the actuating-shafts of said mechanism, detents controlling the movement of said pulleys, a releasing device for said detents operable from said shafts, and a drawer-lock and a bell operable by said releasing device.

6. In a cash-register, the combination with the registering mechanism, of an indicator consisting of graduated tapes rolled upon spring-rollers and connected at their free ends to idle rollers, pulleys mounted upon actuating-shafts of the registering mechanism, connections between said idle rollers and pulleys for extending the tapes, restraining mechanism for holding the tapes extended, and releasing devices therefor automatically operated at each operation of the registering mechanism.

7. In a cash-register, the combination with the registering mechanism, of pulleys loose upon the actuating-shafts thereof, connections between said shafts and pulleys for moving them in one direction, spring-rollers carrying graduated indicating-tapes, idle rollers to which the free ends of said tapes are attached, connections between the idle rollers and said pulleys, detents for holding said pulleys against rotation by the spring-rollers, and means for releasing said detents at the operation of the registering mechanism.

8. In a cash-register, the combination with the registering mechanism, of an indicator, rotary shafts operating the indicator by their forward rotation and the registering mechanism on the return retention devices for said shafts, type-wheels geared to said shafts and operated simultaneously with the indicator, a movable platen on which lies the paper to be printed, means for reciprocating the platen and discharging the paper when printed, and a releasing device operated by the printing mechanism for releasing said rotary shafts.

9. In a cash-register, the combination with the registering mechanism, of type-wheels connected to the same, a paper-supply, a platen over which the paper passes, a shaft carrying a cam which engages said platen for reciprocating it and paper-feeding cams also mounted on said shaft so that their peripheries will engage and feed the paper over said platen.

10. In a cash-register, the combination with the registering mechanism, of type-wheels geared to the actuating-shafts thereof, a reciprocated platen over which the paper passes, feeding-wheels spring-mounted at either side of the type-wheels, and a shaft carrying cams coöperating with said feeding-wheels to feed the paper after the reciprocation of the platen.

11. In a cash-register, the combination with the registering mechanism, of type-wheels geared to the actuating-shafts thereof, a reciprocating platen over which the paper passes, a spring-plate spanning the type-wheels, feeding-wheels journaled in said plate at the sides of the type-wheels, a cam for actuating the platen, the feeding-cams mounted at the sides of the platen-actuating cam and upon the shaft thereof for coöperating with the feeding-wheels to feed the paper as soon as the platen recedes.

12. In a cash-register, the combination with printing-types, of actuating devices for the same arranged to automatically return to normal position when released, a platen, independent actuating devices carrying a cam for operating said platen, means for holding the actuating devices in the positions to which they are moved, and means operated by the independent actuating devices for releasing said holding means.

Signed at New York, in the county of New York and State of New York, this 16th day of November, A. D. 1894.

GEORGE H. GUEST.

Witnesses:
WM. H. CAPEL,
HENRY T. HIRSCH.